(12) United States Patent
Harrison

(10) Patent No.: US 8,074,917 B1
(45) Date of Patent: Dec. 13, 2011

(54) FLYING CYCLE APPARATUS

(76) Inventor: Jeffrey L. Harrison, Phoenix, AZ (US)

( * ) Notice: Subject to any disclaimer, the term of this patent is extended or adjusted under 35 U.S.C. 154(b) by 769 days.

(21) Appl. No.: 12/284,485

(22) Filed: Sep. 23, 2008

(51) Int. Cl.
  *B64C 15/00* (2006.01)
(52) U.S. Cl. ..................................... 244/12.1
(58) Field of Classification Search ............... 244/12.1, 244/12.3, 12.5, 23 B, 23 D
  See application file for complete search history.

(56) References Cited

U.S. PATENT DOCUMENTS

| | | | | |
|---|---|---|---|---|
| 4,071,207 | A * | 1/1978 | Piasecki et al. | 244/23 D |
| 4,840,329 | A * | 6/1989 | Szuminski et al. | 244/12.5 |
| 5,161,741 | A * | 11/1992 | Seyfang | 239/265.35 |
| 7,188,803 | B2 * | 3/2007 | Ishiba | 244/23 R |
| 2004/0056154 | A1 * | 3/2004 | Milde, Jr. | 244/218 |
| 2006/0225404 | A1 * | 10/2006 | Dev | 60/200.1 |
| 2010/0294877 | A1 * | 11/2010 | Jianu | 244/2 |

* cited by examiner

*Primary Examiner* — Frank T Palo
(74) *Attorney, Agent, or Firm* — Adam R. Stephenson, Ltd.

(57) ABSTRACT

A flying cycle apparatus comprises a fuselage and a pair of wings extending laterally from the fuselage to provide lift. A jet engine is mounted within the fuselage with the air intake thereof extending through the front of the fuselage. The jet engine has a jet exhaust extending through the rear thereof with one or more jet exhaust ports extending downwardly through the bottom thereof. The one or more jet exhaust ports provide vertical take off and landing capability. A pilot seat is positioned on top of the fuselage with the pilot seat being adapted to have a pilot's legs straddle the fuselage. The pilot seat if further adapted to have an occupant able to access to a control panel. The control panel has means for controlling the proportion of jet exhaust exiting from each of the jet exhaust and jet exhaust ports. The control panel further including a control joystick which allows the user to maintain a stable position during vertical take off and landing maneuvers and to turn and bank when flying.

20 Claims, 9 Drawing Sheets

FLYING CYCLE APPARATUS

TECHNICAL FIELD

This invention relates generally to the field of flying machines, and, more particularly, to a small, jet propelled, vertical take off and landing flying apparatus in which the pilot straddles the fuselage similar to a motorcycle land vehicle.

BACKGROUND OF THE INVENTION

There are a number of vertical take off and landing aircraft in operation including the Harrier jet fighter and the Osprey marine transport craft. However, such craft are combat aircraft and provide fully enclosed cockpits and transportation. There are no presently available aircraft which utilize an open cockpit or allow a pilot to straddle the fuselage.

The present invention is designed for use by the public for enjoyment, transportation and general fun. None of the known prior art disclose the combination set forth herein.

SUMMARY OF THE INVENTION

It is an object of this invention to provide a new flying apparatus for use by in general aviation which employs vertical take off and landing (VTOL) capability.

It is an further object of this invention to provide a new flying apparatus for use by the general public with VTOL capability and allows a pilot to straddle the fuselage similar to a motorcycle.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
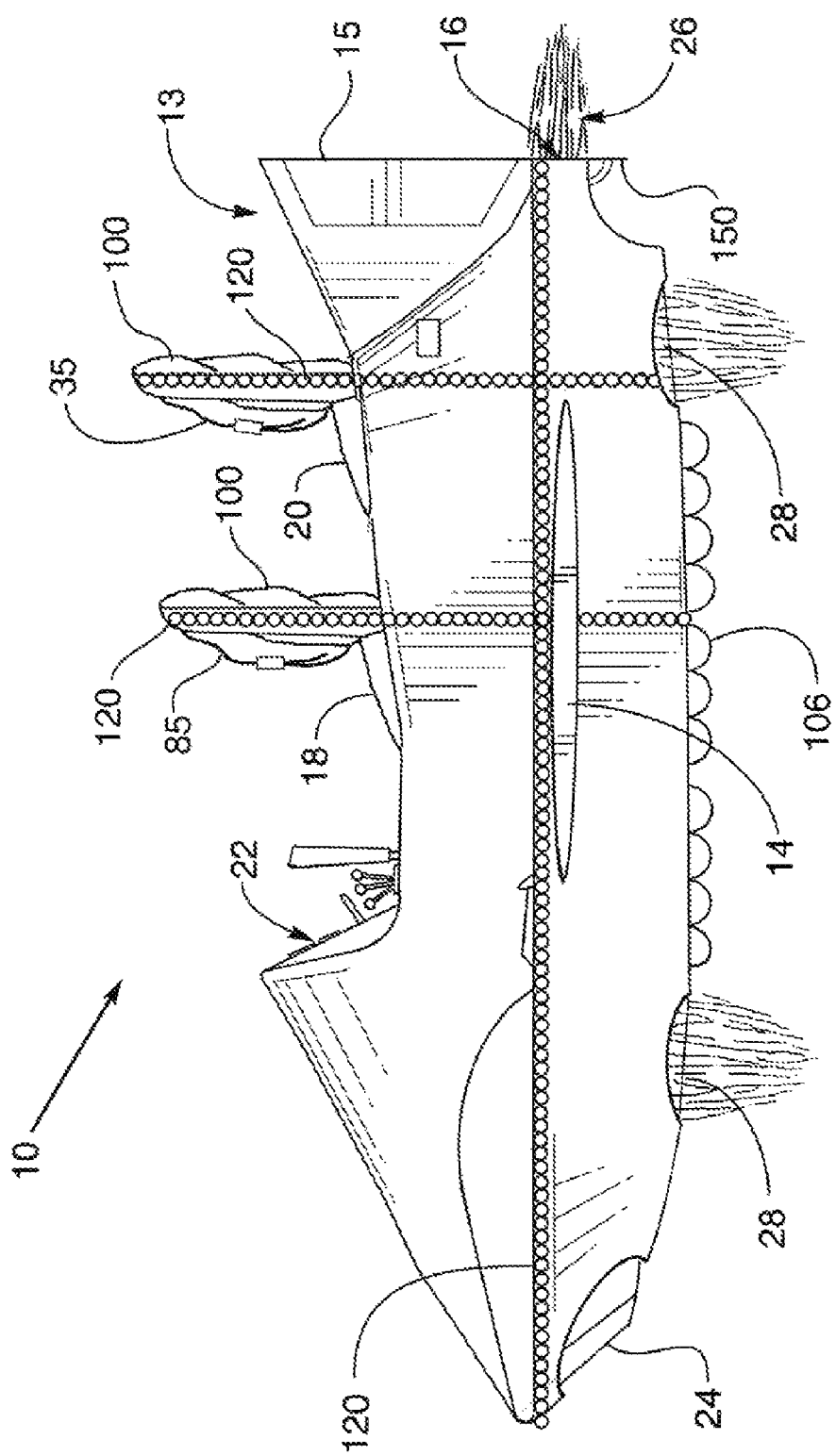
FIG. 1 is a side view of the present invention.

Referring more particularly to the drawings by characters of reference, FIGS. 1-7 disclose combinations of features which constitute the components of a flying cycle apparatus 10 of the present invention. In the presently preferred embodiment, flying cycle apparatus 10 comprises a fuselage 12, wings 14, jet engine 16, pilot seat 18, passenger seat 20 and control panel 22.

As shown, fuselage 12 includes an air intake 24 at the front thereof and a jet exhaust 26 at the rear thereof. In addition, fuselage 12 includes four downward pointing jet exhaust ports 28 positioned on the bottom of fuselage 12 for vertical take off and landing (VTOL) capability. Two jet exhaust ports are positioned at the front of fuselage 12 and the other two jet exhaust ports are positioned at the rear of fuselage 12. By redirecting the jet engine exhaust as desired, apparatus 10 can lift and drop vertically without the need for a runway. Once airborne, jet engine 16 output is redirected to jet exhaust 26 for forward motion. Once fully directed to jet exhaust 26, apparatus 10 is controlled as a conventional aircraft as described below.

Figure 6:
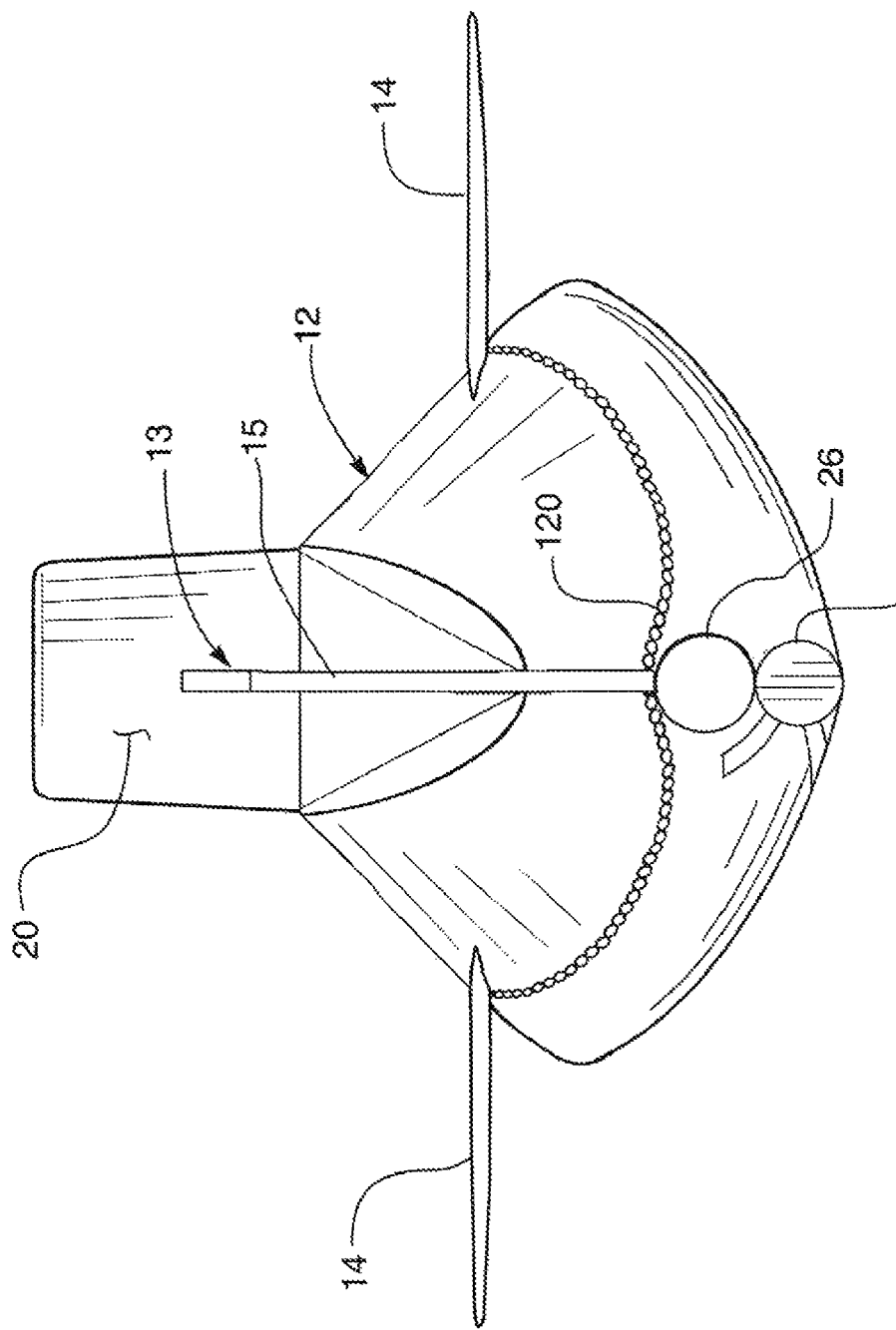
FIG. 6 is a rear view of the present invention.
Figure 8:
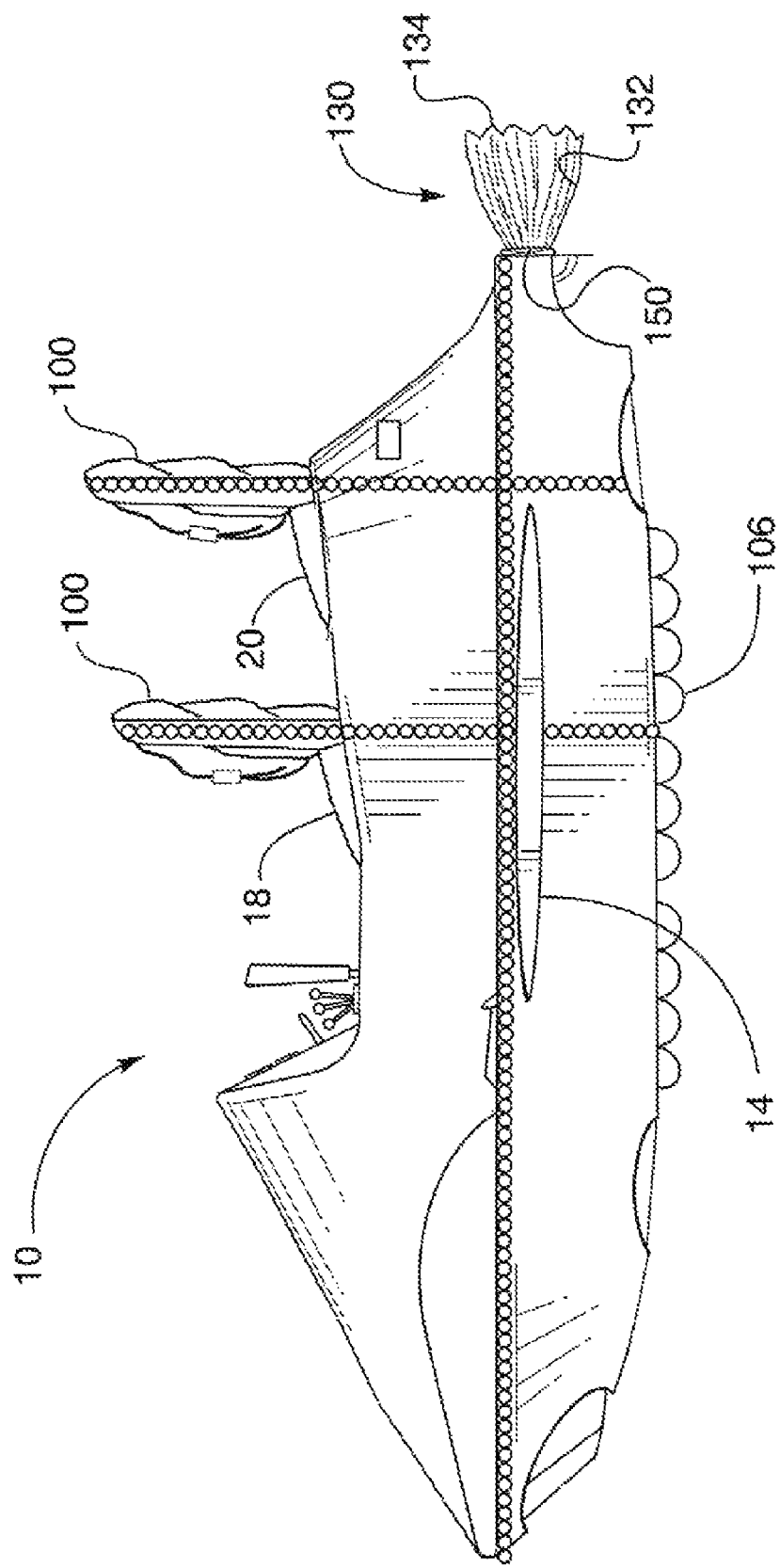
FIG. 8 is a side view of an alternate embodiment of the present invention.

Wings 14 extend laterally from the sides of fuselage 12 and include ailerons 30 for banking and turning apparatus 10 once airborne and in forward motion. For stability, as best seen in FIGS. 1 and 6, one option is a conventional tail structure 13 which includes a vertical rudder 15 which is controlled by a joystick 80. Alternatively, in a far more sophisticated method as shown in FIG. 8, an array 130 known colloquially as "turkey feathers" comprises a plurality of slats 132 which extend into jet exhaust 134. Each of the plurality of slats 132 is individually controlled by an on board computer which makes adjustments to the slats to maintain the vehicle in stable flight. Those skilled in the art will recognize that methods for stabilizing the cycle 10 are available to manufacturers thereof and that the two embodiments illustrated are for illustrative purposes only and are not meant to limit the invention to those two particular configurations.

As in conventional aircraft, ailerons 30 are controlled by a pilot via foot pedals 32 positioned proximate to pilot seat 18 as described in more detail below. Such foot pedals 32 are connected via hydraulics or servo motors to ailerons 30 for activation thereof. Such devices are well known in the art and will not be further discussed herein.

Figure 2:
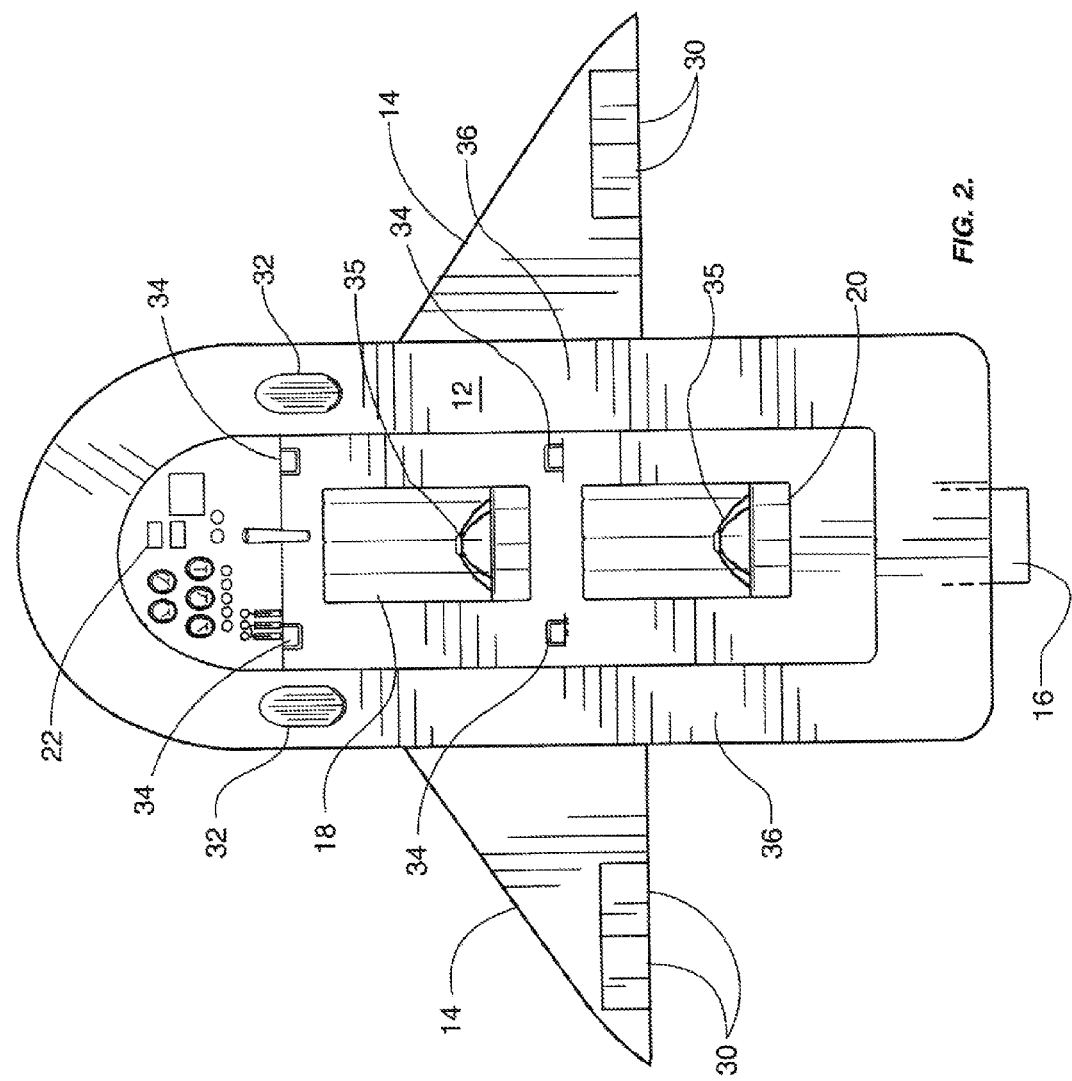
FIG. 2 is a top view of the invention.

Turning now to FIGS. 1 and 2, pilot seat 18 and passenger seat 20 are positioned atop fuselage 12, with pilot seat 18 forward of passenger seat 20. Those skilled in the art will recognize that the present configuration of one pilot and one passenger is illustrative only and that the invention includes single seat versions or multiple passenger versions as well. Hand grips 34 are provided on fuselage 12 for occupants to grasp for security. For safety, a four point harness 35 is preferably provided as best seen in FIG. 2.

The occupant's feet straddle fuselage 12 and a running board 36 is provided on both sides thereof for those feet to rest. Control panel 22 is positioned forward of pilot seat 18 for easy viewing and use thereof.

Figure 4:
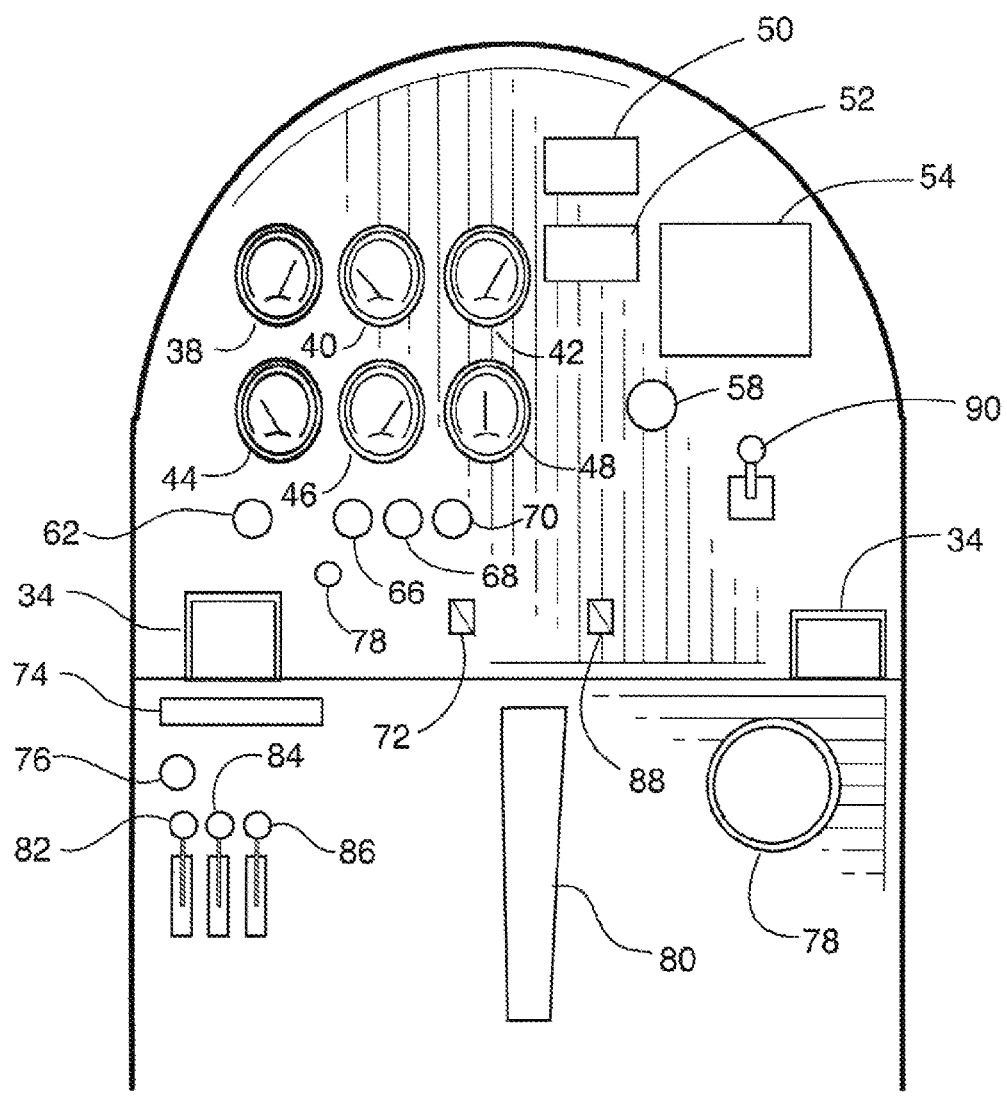
FIG. 4 is a close up view of a control panel used in the present invention.
Figure 5:
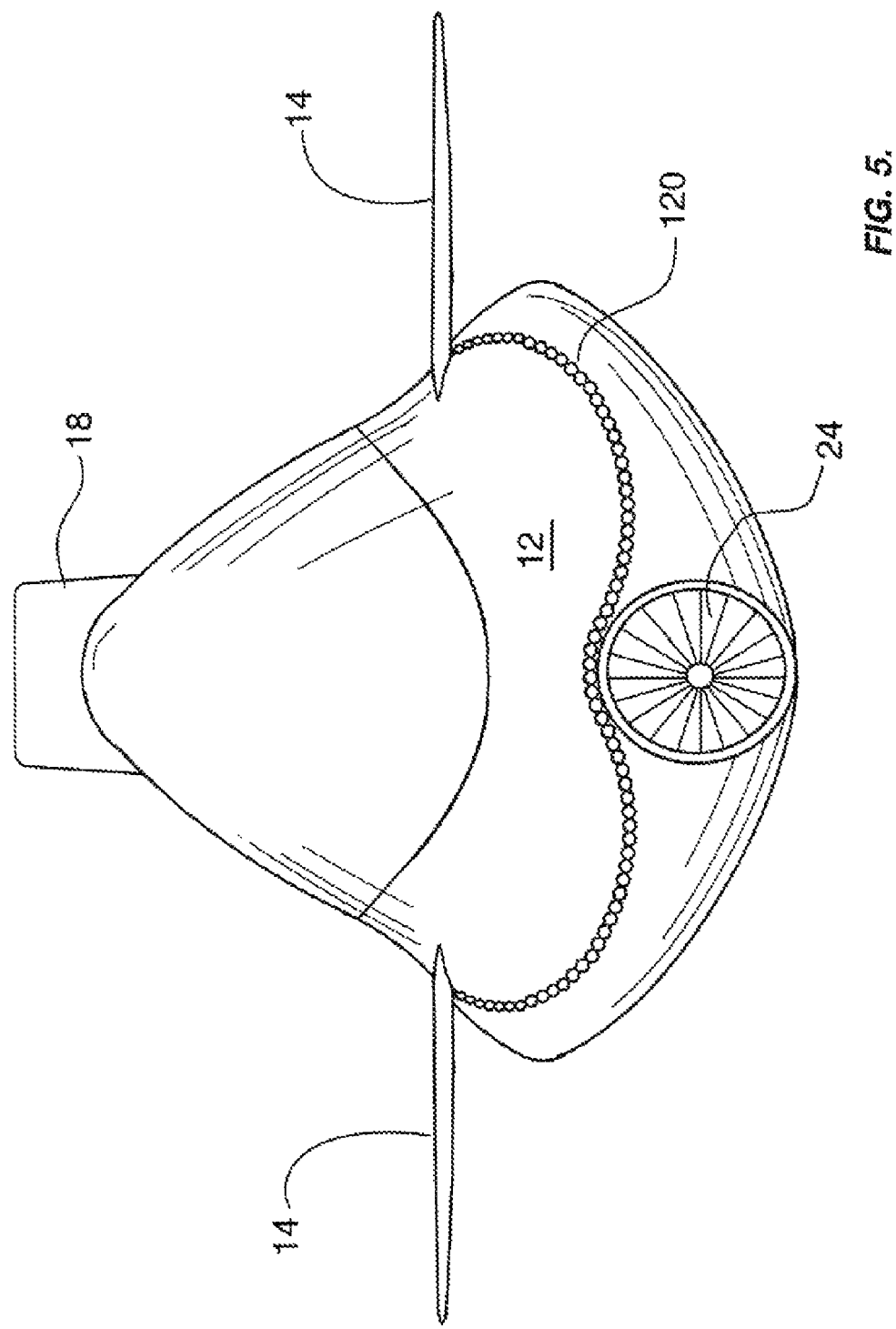
FIG. 5 is a front view of the present invention.

Turning now to FIG. 4, control panel 22 is shown with one possible layout. Those skilled in the art will recognize that control panel 22 as shown is for illustrative purposes only and that the invention is not limited to the particular configuration provided.

Control panel 22 includes, but is not limited to, an airspeed indicator 38, an attitude coordinator 40, an altimeter 42, a turn coordinator 44, a vertical airspeed indicator 46, a compass 50, a fuel indicator 52, a GPS system 54, a tachometer 58, an revolution per minute indicator 62, an oil pressure indicator 66, an oil temperature indicator 68, a temperature indicator 70.

For controlling apparatus 10, a pilot will utilize a master switch 72 to activate the electrical systems thereof. A primer button 76 primes jet engine 16 for ignition which is accomplished by pressing ignition button 88. An engine throttle 90 controls the thrust generated by jet engine 16. In the illustrated embodiment, a left side throttle control 82, a right side throttle control 86 and a forward throttle control 84 determine the amount of jet engine 16 exhaust is directed to the left side jet exhausts 28, right side jet exhausts 28 and rear jet exhaust 26. A pilot can fine tune the thrust vectors to allow apparatus 10 to rise, hover, drop and move forward as desired. A control joystick 80 allows the user to maintain a stable position during VTOL maneuvers. in combination with foot pedals 32 allow a pilot to turn and bank apparatus 10 as desired.

Figure 3:
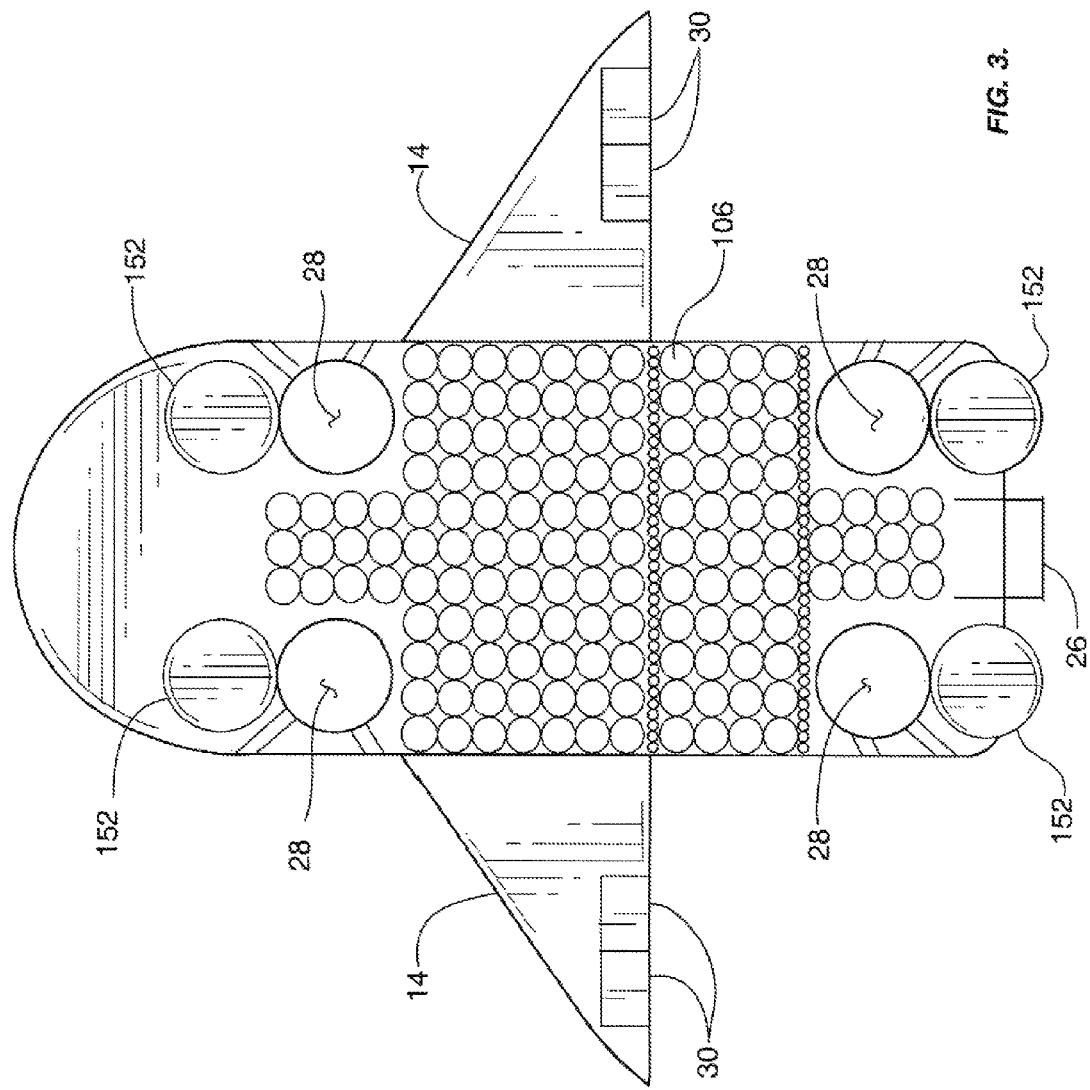
FIG. 3 is a bottom view of invention with jet exhausts in an open position.
Figure 9:
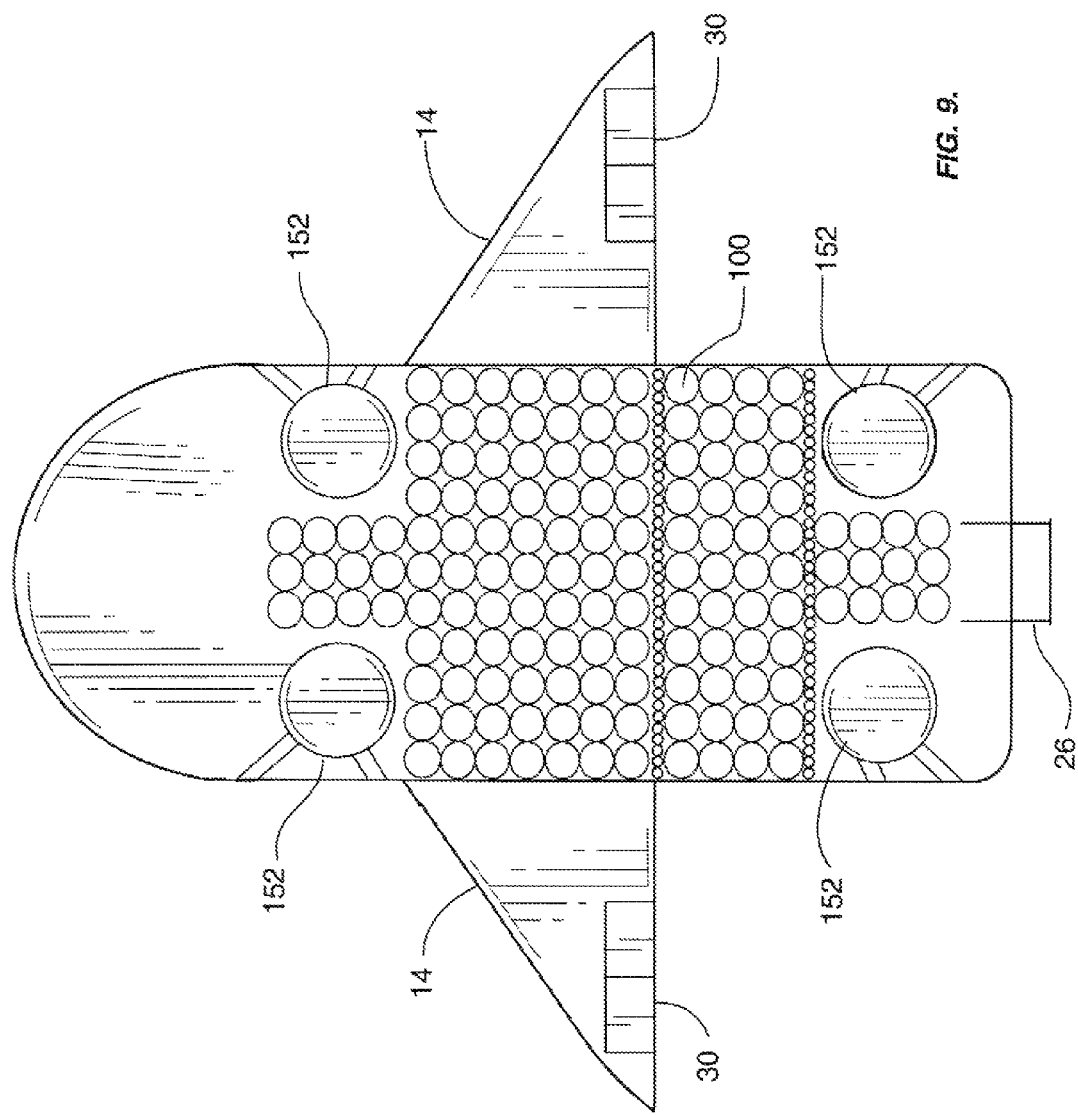
FIG. 9 is a bottom view of invention with jet exhausts in a closed position.
Figure 1:
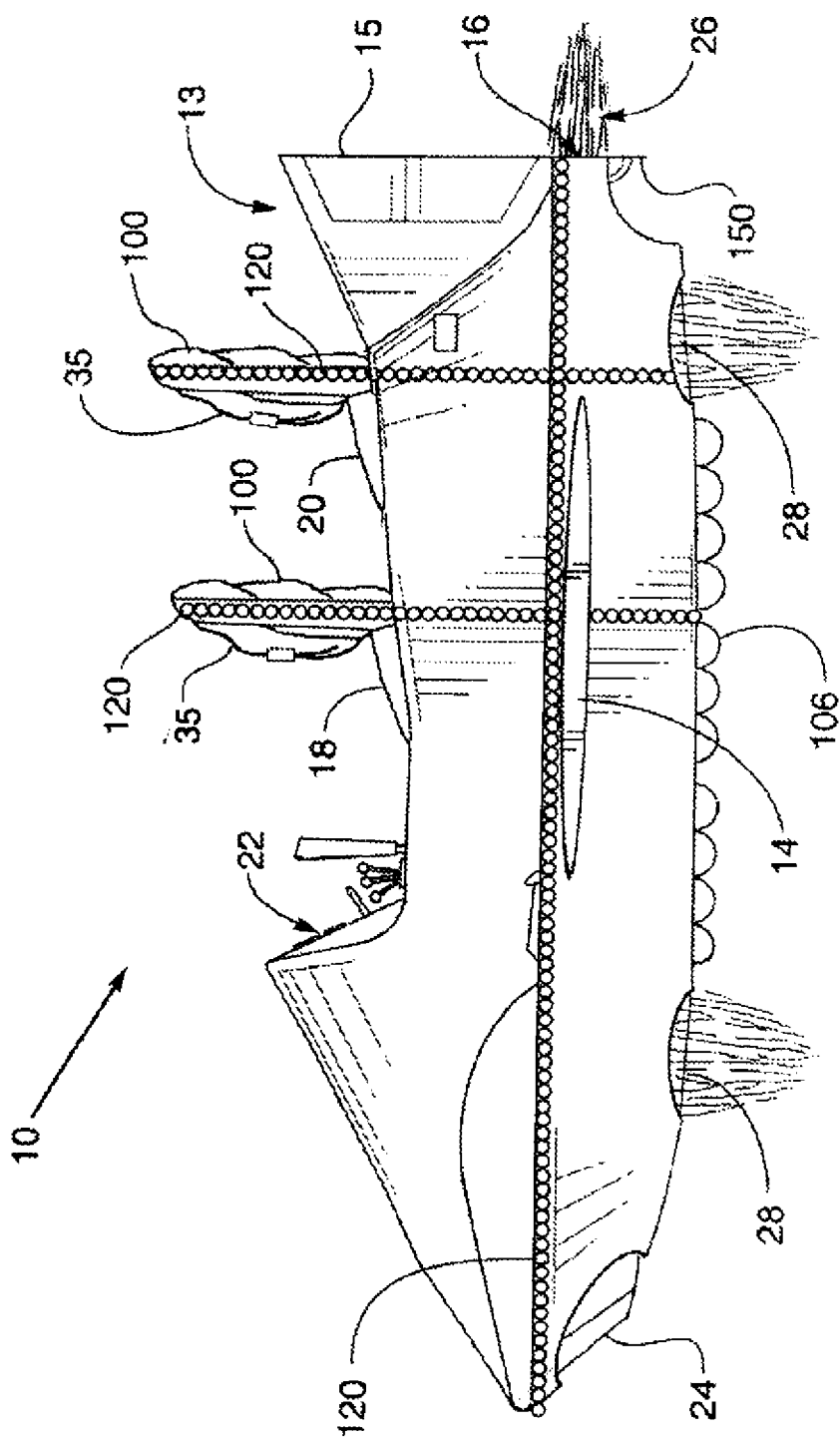

In the usual manner for take off, the rear jet exhaust 26 are closed by a cover 150 as shown in FIG. 6 and lower exhausts 28 are open as shown in FIG. 3. Thus, the thrust of jet engine 16 is directed downwards thereby creating lift. The pilot will slowly increase jet engine 16 throttle 90 and adjust left side throttle control 84 and right side throttle control 88 as needed to maintain cycle 10 on an even level. Upon achieving a desired altitude, cover 150 is removed, as best seen in FIG. 1, via rear throttle control 86 thereby generating thrust moving cycle 10 forward. Once the forward velocity is sufficient for wings 14 to provide lift, left side throttle controls 84 and right side throttle control 88 are used to close lower exhaust ports 28 with covers 152 as best seen in FIG. 9. From this point, cycle 10 will fly and respond like a standard fixed wing aircraft, albeit on a smaller scale.

To land cycle 10, a pilot would approach the landing point and slowly reduce engine thrust via engine throttle 90. The bottom exhausts 28 are opened by removing covers 152 via throttle controls 84 and 88. Once opened sufficiently to provide, lift, rear jet exhaust 26 is closed by cover 150 thereby stopping forward thrust and movement. Engine throttle 90 is used to reduce engine thrust whereby cycle 10 settles into the landing.

Note that cycle 10 can use a rolling take off and landing if desired by simply keeping lower exhausts 28 closed and rear jet exhaust 26 open. Alternatively, a short rolling take off and landing can be accomplished by having all exhausts 26 and 28 open whereby lift is obtained both by wings 14 and lower exhausts 28.

An ejection button 78 which actuates parachutes 100 which are positioned in the back of seats 18 and 20 is provided if the aircraft becomes uncontrollable. A transponder 104 is optionally mounted on the exterior of fuselage 12 to provide rescuers with the location of apparatus 10 in an emergency. Also, a fuel cap 102 provided access to the fuel tanks of apparatus 10 for use with an appropriate jet fuel such as Fuel Jet Type A. For aesthetic purposes, strings 120 of lights can be mounted on fuselage 12 in either a horizontal fashion as or vertically and use seats 18 and 20 to create a horizontal halo or two vertical rings of lights.

As best seen in FIGS. 3 and 9, rubber spheres 106 are rotatably embedded in the bottom of fuselage 12 to act as a plurality of wheels for landing. Thus use of rotatable spheres 105 allows for running take offs and landings. In addition, such spheres 106 will allow cycle 10 to yaw as much as 45 degrees during such a rolling take off without difficulty. While standard aircraft wheels can be used with cycle 10, the wheels would not allow for the degree of yawing described above before catching and crashing cycle 10.

Figure 7:
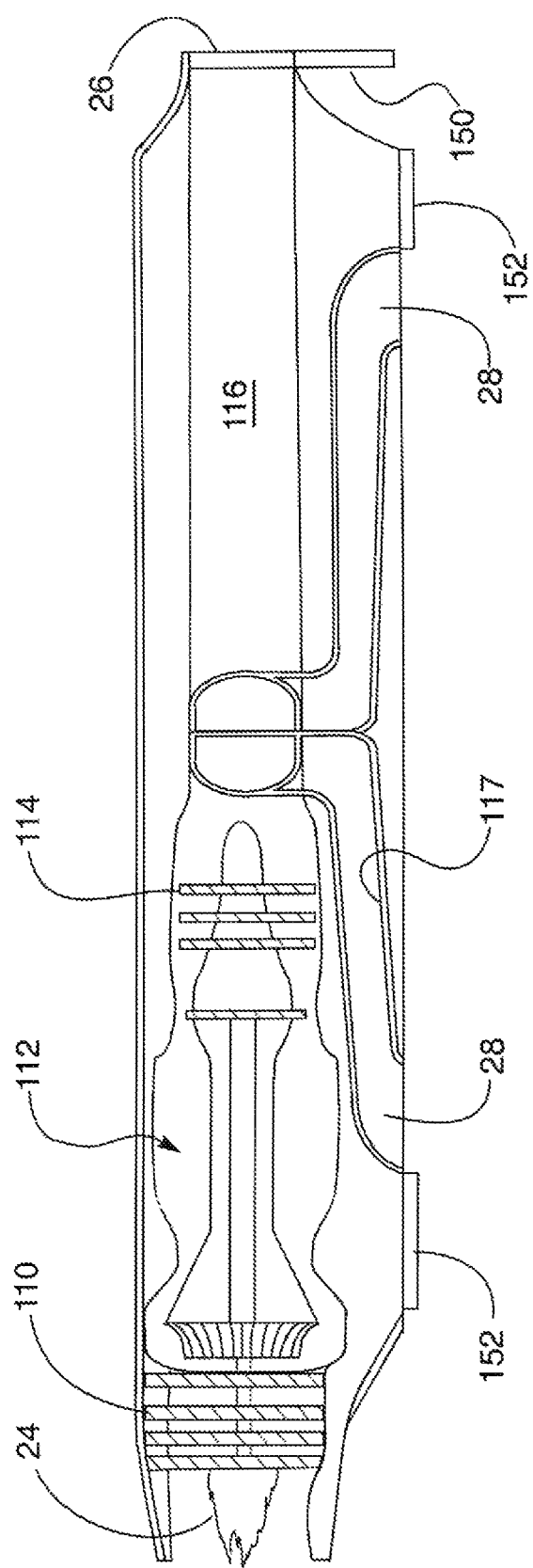
FIG. 7 is a side perspective view of a jet engine used in the present invention.

Turning now to FIG. 7, turbine jet engine 16 suitable for use with the present invention is shown. Air enters intake 24 and encounters compressor 110 before entering the combustion chamber 112. After ignition in chamber 112, the combustion products move through turbines 114 before exiting into chamber 116. Chamber 116 is directly open to rear jet exhaust 16. In chamber 116 but proximate to turbines 114, one end of four pipes 117 is positioned. The other end of each of the four pipes 117 is connected to bottom jet exhausts 28 as illustrated. Covers 150, 152 are movable via levers 82, 84 and 86 to direct the jet exhaust as desired. Covers 150 and 152 or connected mechanically or hydraulically to levers 82, 84 and 86 as desired.

Although only certain embodiments have been illustrated and described, it will be apparent to those skilled in the art that various changes and modifications may be made therein without departing from the spirit of the invention or from the scope of the appended claims.

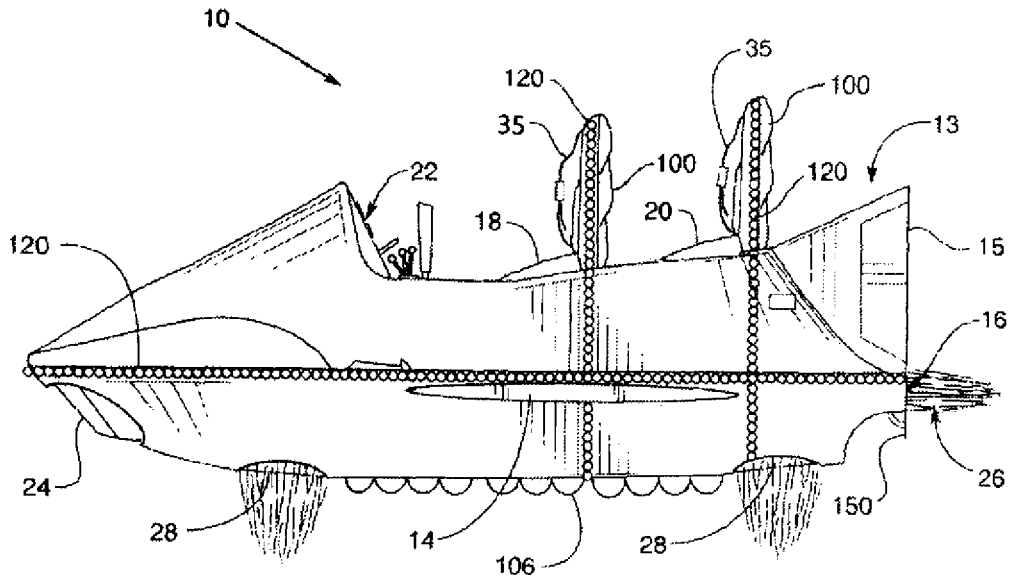

What is claimed is:

1. A flying cycle apparatus comprises:
a fuselage,
a pair of wings extending laterally from the fuselage to provide lift therefore,
a jet engine mounted within the fuselage, the air intake of the jet engine extending through the front of the fuselage, a jet exhaust of the jet engine extending through the rear of the fuselage, one or more jet exhaust ports extending downwardly through the bottom of the fuselage, the one or more jet exhaust ports providing vertical take off and landing capability,
a pilot seat positioned on top of the fuselage, the pilot seat adapted to have a pilot's legs straddle the fuselage, the pilot seat adapted to have an occupant able to access to a control panel, the control panel having means for controlling the proportion of jet exhaust exiting from each the jet exhaust and jet exhaust ports, the control panel further including a control joystick allows the user to maintain a stable position during vertical take off and landing maneuvers and to turn and bank when flying.

2. The flying cycle apparatus of claim 1 having one or more passenger seats.

3. The flying cycle apparatus of claim 1 having four jet exhaust ports extending downwardly from the bottom of the fuselage, two of the four jet exhaust ports being mounted along the right side of the fuselage and two of the jet exhaust ports being mounted on the left side of the fuselage, the four jet exhaust ports in combination providing vertical take off and landing capability.

4. The flying cycle apparatus of claim 1 wherein the wings further include ailerons.

5. The flying cycle apparatus of claim 4 wherein the ailerons are controlled via foot pedals mounted proximate to the pilot seat, and which, in combination with the joystick allow a pilot to turn and bank the flying cycle apparatus as desired.

6. The flying cycle apparatus of claim 1 further comprising a running board adapted to have the feet of an occupant of the pilot seat resting thereon.

7. The flying cycle apparatus of claim 1 wherein the control panel includes one or more instruments from a group comprising an airspeed indicator, an attitude coordinator, an altimeter, a turn coordinator, a vertical airspeed indicator, a compass, a fuel indicator, a GPS system, a tachometer, an revolution per minute indicator, an oil pressure indicator, an oil temperature indicator, a temperature indicator.

8. The flying cycle apparatus of claim 1 wherein the means for controlling the proportion of jet exhaust comprises a plurality of throttle control levers connected to a corresponding plurality of covers.

9. The flying cycle apparatus of claim 1 further comprising a master switch to activate the electrical systems thereof.

10. The flying cycle apparatus of claim 1 further comprising a primer button to prime the jet engine for ignition and an ignition button which ignites fuel in the jet engine.

11. The flying cycle of claim 2 further comprising parachutes corresponding to the pilot seat and the one or more passenger seats, the parachutes adapted to be released when an ejection button on the control panel is actuated.

12. The flying cycle apparatus of claim 1 further comprising rubber spheres rotatably embedded in the bottom of the fuselage to provide a landing gear in the event of a rolling take off and landing.

13. The flying cycle apparatus of claim 1 wherein strings of lights are mounted in the fuselage.

14. The flying cycle apparatus of claim 3 wherein the jet engine is a turbine jet engine whose exhaust exits into a chamber, the chamber having the one jet exhaust in the rear thereof and the four jet exhaust ports in the bottom thereof.

15. A flying cycle apparatus comprises:
   a fuselage,
   a pair of wings extending laterally from the fuselage to provide lift therefore, the wings having ailerons, the ailerons being controlled via foot pedals mounted proximate to the pilot seat, and which, in combination with a joystick allow a pilot to turn and bank the flying cycle apparatus as desired,
   a jet engine mounted within the fuselage, the air intake of the jet engine extending through the front of the fuselage, a jet exhaust of the jet engine extending through the rear of the fuselage, four jet exhaust ports extending downwardly through the bottom of the fuselage, the one or more jet exhaust ports providing vertical take off and landing capability, the jet engine being a turbine jet engine whose exhaust exits into a chamber, the chamber having the one jet exhaust in the rear thereof and the four jet exhaust ports in the bottom thereof,
   a pilot seat positioned on top of the fuselage, the pilot seat adapted to have a pilot's legs straddle the fuselage, the pilot seat adapted to have an occupant able to access to a control panel, the control panel having a plurality of throttle control levers connected to a corresponding plurality of covers for controlling the proportion of jet exhaust exiting from each the jet exhaust and jet exhaust ports, the control panel further including a control joystick allows the user to maintain a stable position during vertical take off and landing maneuvers and to turn and bank when flying, the control panel further including one or more instruments from a group comprising an airspeed indicator, an attitude coordinator, an altimeter, a turn coordinator, a vertical airspeed indicator, a compass, a fuel indicator, a GPS system, a tachometer, an revolution per minute indicator, an oil pressure indicator, an oil temperature indicator, a temperature indicator,
   one or more passenger seats adapted to have a passenger's legs straddling the fuselage, and
   a running board adapted to have the feet of an occupant of the pilot seat and the one or more passenger seats resting thereon.

16. The flying cycle apparatus of claim 15 further comprising a master switch to activate the electrical systems thereof.

17. The flying cycle apparatus of claim 15 further comprising a primer button to prime the jet engine for ignition and an ignition button which ignites fuel in the jet engine.

18. The flying cycle of claim 15 further comprising parachutes corresponding to the pilot seat and the one or more passenger seats, the parachutes adapted to be released when an ejection button on the control panel is actuated.

19. The flying cycle apparatus of claim 15 further comprising rubber spheres rotatably embedded in the bottom of the fuselage to provide landing gear in the event of a rolling take off and landing.

20. The flying cycle apparatus of claim 15 wherein strings of lights are mounted in the fuselage.

\* \* \* \* \*

UNITED STATES PATENT AND TRADEMARK OFFICE
CERTIFICATE OF CORRECTION

| | | |
|---|---|---|
| PATENT NO. | : 8,074,917 B1 | |
| APPLICATION NO. | : 12/284485 | |
| DATED | : December 13, 2011 | |
| INVENTOR(S) | : Jeffrey L. Harrison | |

It is certified that error appears in the above-identified patent and that said Letters Patent is hereby corrected as shown below:

Delete title page, and substitute the attached title page therefor.

On the Title page, paragraph (57), line 11, cancel the text "seat if further" and insert --seat is further--

Delete drawing sheet 1, and substitute the attached drawing sheet 1 therefor.

Drawings, FIG. 1, element 85 should be 35.

Drawings, FIG. 4, there are two elements numbered 78—one points to a larger round button on the lower right hand side of the control panel 22, the other pointing to a smaller round button on the upper left hand side of the control panel 22. The element 78 pointing to the smaller round button on the upper left hand side of the control panel 22, and the line extending from it, should be deleted.

Drawings, FIG. 9, element number 100 should be changed to 106.

Column 3, line 6, cancel the text "maneuvers. in combination with foot pedals 32 allow" and insert --maneuvers in combination with foot pedals 32 to allow--

Column 3, line 12, cancel the text "control 84 and right side throttle control 88" and insert --control 82 and right side throttle control 86--

Column 3, line 17, cancel the text "via rear throttle control 86" and insert --via forward throttle control 84--

Column 3, line 19, cancel the text "left side throttle controls 84 and right side throttle control 88" and insert --left side throttle control 82 and right side throttle control 86--

Column 3, line 27, cancel the text "throttle control 84 and 88" and insert --throttle controls 82 and 86--

Signed and Sealed this
Nineteenth Day of March, 2013

Teresa Stanek Rea
*Acting Director of the United States Patent and Trademark Office*

Column 3, line 27, cancel the text "sufficiently to provide, lift" and insert --sufficiently to provide lift--

Column 3, line 40, cancel the text "transponder 104" and insert --transponder--

Column 3, line 47, cancel the text "and use seats 18 and 20 to" and insert --and seats 18 and 20 may be used to--

Column 3, line 51, cancel the text "rotatable spheres 105 allows" and insert --rotatable spheres 106 allows--

Column 3, line 64, cancel the text "exhaust 16" and insert --exhaust 26--

Column 4, line 1, cancel the text "or connected mechanically" and insert --are connected mechanically--

Claim 18, column 6, line 23, cancel the text "flying cycle" and insert --flying cycle apparatus--

(12) United States Patent
Harrison

(10) Patent No.: US 8,074,917 B1
(45) Date of Patent: Dec. 13, 2011

(54) FLYING CYCLE APPARATUS

(76) Inventor: Jeffrey L. Harrison, Phoenix, AZ (US)

(*) Notice: Subject to any disclaimer, the term of this patent is extended or adjusted under 35 U.S.C. 154(b) by 769 days.

(21) Appl. No.: 12/284,485

(22) Filed: Sep. 23, 2008

(51) Int. Cl.
*B64C 15/00* (2006.01)

(52) U.S. Cl. .................................................. 244/12.1
(58) Field of Classification Search .................. 244/12.1, 244/12.3, 12.5, 23 B, 23 D
See application file for complete search history.

(56) References Cited

U.S. PATENT DOCUMENTS

| | | | | |
|---|---|---|---|---|
| 4,071,207 A | * | 1/1978 | Piasecki et al. | 244/23 D |
| 4,840,329 A | * | 6/1989 | Szuminski et al. | 244/12.5 |
| 5,161,741 A | * | 11/1992 | Seyfang | 239/265.35 |
| 7,188,803 B2 | * | 3/2007 | Ishiba | 244/23 R |
| 2004/0056154 A1 | * | 3/2004 | Milde, Jr. | 244/218 |
| 2006/0225404 A1 | * | 10/2006 | Dev | 60/200.1 |
| 2010/0294877 A1 | * | 11/2010 | Jianu | 244/2 |

* cited by examiner

Primary Examiner — Frank T Palo
(74) Attorney, Agent, or Firm — Adam R. Stephenson, Ltd.

(57) ABSTRACT

A flying cycle apparatus comprises a fuselage and a pair of wings extending laterally from the fuselage to provide lift. A jet engine is mounted within the fuselage with the air intake thereof extending through the front of the fuselage. The jet engine has a jet exhaust extending through the rear thereof with one or more jet exhaust ports extending downwardly through the bottom thereof. The one or more jet exhaust ports provide vertical take off and landing capability. A pilot seat is positioned on top of the fuselage with the pilot seat being adapted to have a pilot's legs straddle the fuselage. The pilot seat if further adapted to have an occupant able to access to a control panel. The control panel has means for controlling the proportion of jet exhaust exiting from each of the jet exhaust and jet exhaust ports. The control panel further including a control joystick which allows the user to maintain a stable position during vertical take off and landing maneuvers and to turn and bank when flying.

20 Claims, 9 Drawing Sheets